Dec. 16, 1952 C. S. HUNTER ET AL 2,622,026
PHOTOGRAPHIC ELEMENT AND TINTED FILM BASE
Filed Oct. 20, 1951
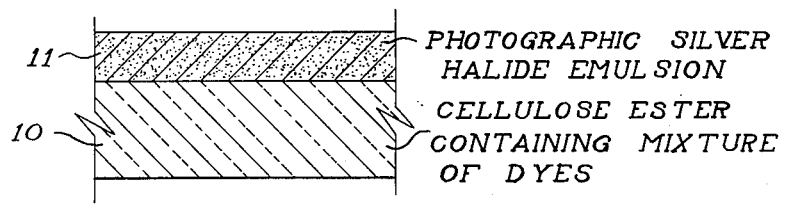
CLARENCE S. HUNTER
FRED W. HOYT
GALE F. NADEAU
INVENTORS
BY Daniel I. Mayne
Lawrence H. Willis
ATTORNEY — AGENT Patented Dec. 16, 1952

2,622,026

UNITED STATES PATENT OFFICE 2,622,026

PHOTOGRAPHIC ELEMENT AND TINTED FILM BASE

Clarence S. Hunter, Fred W. Hoyt, and Gale F. Nadeau, Rochester, N. Y., assignors to Eastman Kodak Company, Rochester, N. Y., a corporation of New Jersey Application October 20, 1951, Serial No. 252,286

8 Claims. (Cl. 95—8)

This invention relates to a photographic element. More particularly it relates to photographic elements comprising a film base tinted in such a manner as to be useful for antihalation purposes.

It is known that film base can be dyed for various purposes, such as identification, filtering of unwanted portions of the visual spectrum and the like. It is also known that film bases can be tinted with a mixture of dyes, at least one of the absorption maxima of at least one of the dyes corresponding to at least one of the absorption minima of the other dye, and at least one of the dyes being removable in photographic developing baths.

While in some instances, mixtures of dyes obtained according to the prior art may give more or less uniform absorption over the visual region of the spectrum, i. e. 400–700 m$\mu$, they offer little or no protection in the infra-red, or near infra-red (i. e. 700–800 m$\mu$) regions.

It is, therefore, an object of our invention to provide photographic elements, the base of which is dyed in such a manner as to prevent absorption of visual light, which might otherwise be transmitted through the transparent support to the light-sensitive emulsion, and also prevent penetration of light in the infra-red region. Another object is to provide non-corrosive mixtures of dyes, which have no adverse effects when coating the viscous solutions or dopes used in film manufacture into the thin sheets or rolls used as film supports. Other objects will become apparent from a consideration of the following description and examples.

It is important that the mixture of dyes afford protection not only in the visual region of the spectrum, but also in the near infra-red and long infra-red regions, since such wavelengths otherwise penetrate the exposed edge of the leader end of the film protruding from a casette or magazine, and travel inside the thickness of the film until they strike a curved surface at such an angle that they bend toward the center of the roll of film and fog the area of each lap of film through which they pass. It is also important that the mixture of dyes be non-corrosive in casting the viscous solutions containing them, or coating into rolls. Since the mixtures of dyes of our invention are adapted primarily for use with negative emulsions, the dyes should not be of the fugitive type, i. e. removable in photographic processing solutions.

Previously, film bases have been tinted by means of such dyes as Nigrosine Spirit Jet (color index 864), Grasol Fast Black G and Sudan Black G, however, the first two of these dyes are extremely corrosive, while the latter provides no protection in the near infra-red region of the spectrum. It was because of the deficiencies of such neutral dyes that it was necessary to resort to mixtures of certain colored dyes.

Advantageously, we add a solution of a dye (red) having its maximum adsorption in the blue and green regions of the spectrum with a dye (blue-green) having its maximum absorption in the red and infra-red regions of the spectrum, to a viscous solution containing the cellulose acetate. The viscous solution, after intimate mixing with the dye solution, is then cast into sheets or coated into rolls. The film then produced advantageously has a neutral density of from 0.1 to 0.4, which is unchanged by processing solutions ordinarily encountered in photography. The solvents used for the dye mixtures can be varied, depending on the particular dyes used, although we have found that the lower aliphatic alcohols (e. g. methanol, ethanol, etc.) and alkylene halides (e. g. ethylene chloride, etc.) are usually the most useful.

Red dyes which are useful in practicing our invention include monoazo dyes containing a nitrophenylazophenyl structure, such, for example, as can be illustrated by the following formulas:

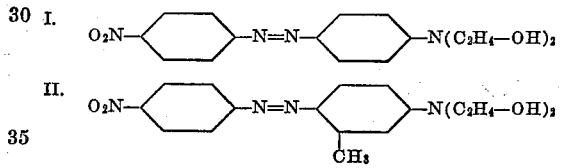

Another useful red dye is:

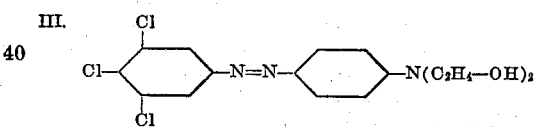

The dyes represented by Formulas I–III above have been previously described in U. S. Patent 1,673,301, issued June 12, 1928. Each of these dyes contain a di-(hydroxyethyl) aminophenylazophenyl structure and have been found to be especially useful.

Also useful in practicing our invention is the red dye having the following formula:

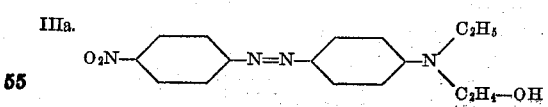

Other monoazo dyes having maximum adsorption in the blue and green regions of the spectrum can be used although the above dyes have been found to be especially useful. As noted above, the requirements for the blue-green (cyan) dye are more rigid than those for the red dye, since the former must have absorption in the infra-red.

The blue-green or cyan dyes which have been found to be most useful in practicing our invention comprise dihydroxy-di-(hydroxyalkoxyphenylamino) anthraquinones wherein the hydroxyl and hydroxyalkoxyphenylamino groups are in the 1, 4, 5, and 8 positions, the term hydroxyalkoxyl being considered generic to groups containing a plurality of alkoxyl groups. Typical are:

IV.

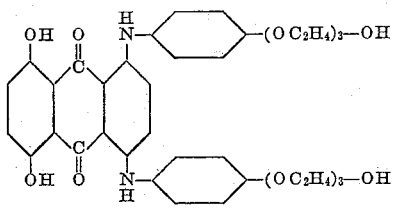

V.

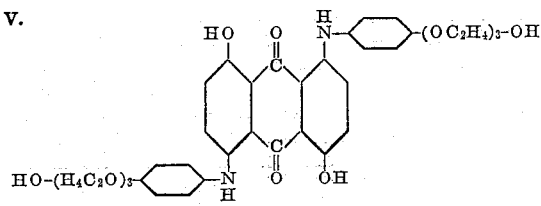

or a mixture of dyes IV and V. The dye represented by Formula IV can be prepared by condensing the leuco form of 1, 4, 5, 8-tetrahydroxyanthraquinone with p(β-hydroxyethoxyethoxyethoxy) aniline in the presence of sodium carbonate. See U. S. Patent 1,969,748 and U. S. Patent 2,391,0111. The following example describes the method of making dye IV.

*Example 1.—1-4-di-[p-(β-hydroxyethoxyethoxyethoxy)phenyl]amino - 5,8 - dihydroxyanthraquinone*

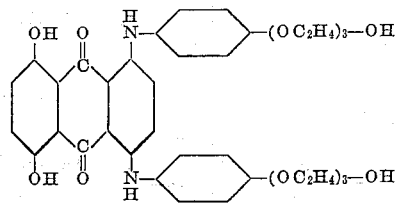

One-hundred and seventy-five grams (0.639 mole) of leuco 1,4,5,8-tetrahydroxyanthraquinone, 500 grams (2.07 moles) of p-aminophenyl-β-hydroxy-β-ethoxyethyl ether, and 62.4 grams (0.743 mole) of sodium bicarbonate were placed in 6250 cc. water and heated at reflux with stirring for 65 hours. The hot reaction mixture was poured with stirring into 20 liters of water containing 300 cc. conc. hydrochloric acid, stirred for one hour and filtered, washed well with 5 liters of water and dried at 50° C. Yield was 301 grams or 65.5% of theory.

The dye represented by Formula V above was prepared by condensing 1,5-dichloro-4,8-dihydroxyanthraquinone with p-(β-hydroxyethoxyethoxy)aniline. Alternatively, a blue-green (cyan) dye of the azo dye series can be used, provided such dye is not bleached by photographic processing solutions. Such a dye is 1 - amino - (6-ethylsulfonamido-2,4-dinitrophenylazo)-5-naphthol represented by the following formula:

VI.

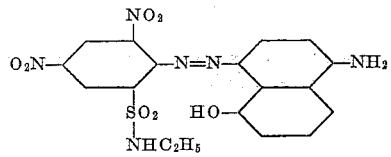

This dye was prepared by coupling diazotized 1 - amino-2,4-dinitrobenzene-6-sulfonethylamide with 5-amino-1-naphthol, following the general procedure outlined in U. S. Patent 2,251,947, dated August 12, 1941. (See Example I.)

The following example will serve to illustrate more fully the manner whereby we practice our invention.

*Example 2*

Two solutions were made up as follows:

Solution A:                                Parts by weight

Cellulose triacetate _____     1
Solvent:
  90 methylene chloride  }_____ 5.4–5.5
  10% methanol           }

Plasticizer:
  Triphenyl phosphate _____      0.15

Solution B:
  Dye of Formula IV _____ grams__ 166
  Dye of Formula II _____ do____  34.8
  Ethylene chloride _____ pounds__ 18
  Methanol _____ do____   2

One pound of Solution B was then mixed together with 200 pounds of Solution A and the mixture kneaded until uniform. The resulting solution was then cast into a sheet of 0.00525" finished thickness. It had an optical density of 0.20 to 0.22 and absorbed light uniformly through the visual region of the spectrum, and in the infra-red region.

The accompanying drawing illustrates schematically a photographic element obtained according to our invention. The element comprises a support 10, comprising a cellulose ester having incorporated therein a mixture of dyes, such as those illustrated in Example 2, said dyes being mixed in such proportions as to give a neutral optical density of from 0.1 to 0.4, and having thereon a photographic silver-halide emulsion 11. Instead of a single photographic silver-halide emulsion, the support 10 can be coated with a plurality of emulsions, for example, as shown in U. S. Patents 2,350,764, dated June 6, 1944; 2,360,214, dated October 10, 1944; 2,376,202, dated May 15, 1945; 2,391,198, dated December 18, 1945; 2,403,721, dated July 9, 1946; etc. The photographic emulsion layer 11, and those described in the above U. S. patents are the usual gelatino-silver halide emulsions customarily used in the art of black and white or multi-color reproduction. These emulsions can also consist of silver halide dispersed in other water-permeable colloidal materials, such as synthetic resins, e. g. polyvinyl alcohol, hydrolyzed polyvinyl acetate, etc., cellulose ethers and esters, etc. Typical silver halide emulsions include silver chloride bromide, bromiodide, and chlorobromide types. The photographic silver halide emulsions can contain the usual addenda such as polymethine sensitizing dyes, anti-foggants, etc.

The cellulose ester support 10 is generally cellulose acetate containing from 42.5 to 44.0 per cent acetyl (i. e. cellulose triacetate). Cellulose acetate containing from 42.5 to 44.0 per cent by weight, and more particularly from 43.0 to 43.5 per cent by weight, of acetyl provides a film base possessing unusual resistance to tear and separation when subjected to stress or strain. (See, for example, Fordyce et al. U. S. Patents 2,492,977 and 2,492,978, dated January 3, 1950). The mixtures of dyes, as defined above and when used according to our invention, have no adverse effect on the physical properties of the cellulose ester support, we have found. Instead of the solvents used in Example 2 to dissolve the cellulose triacetate, the solvents described in U. S. Patents 2,492,977 and 2,492,978 can be used.

What we claim as our invention and desire secured by Letters Patent of the United States is:

1. A photographic element comprising at least one photographic silver halide emulsion layer and a cellulose ester layer containing a red dye selected from those of the monoazo dye series containing a di-hydroxyethyl) aminophenylazophenyl group and a cyan dye selected from those represented by the following formulas:

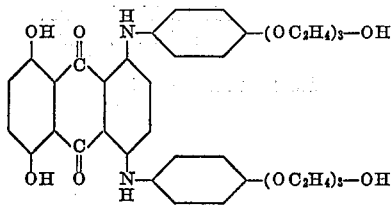

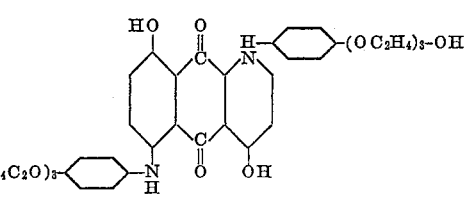

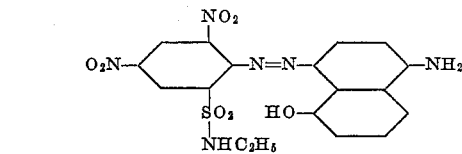

said dyes being present in such amounts as to give a neutral, optical density of from 0.1 to 0.4.

2. A photographic element comprising at least one photographic silver halide emulsion layer and a cellulose acetate layer containing a red dye selected from those of the monoazo dye series containing a di-(hydroxyethyl) aminophenylazophenyl group and a cyan dye having the following formula:

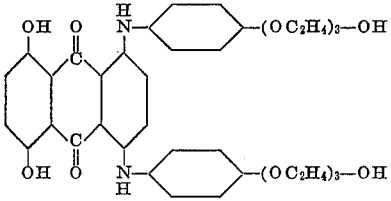

said dyes being present in such amounts as to give a neutral, optical density of from 0.1 to 0.4.

3. A photographic element comprising at least one photographic silver halide emulsion layer and a cellulose acetate layer containing a red dye selected from those of the monoazo dye series containing a di-(hydroxyethyl) aminophenylazophenyl group and a cyan dye having the following formula:

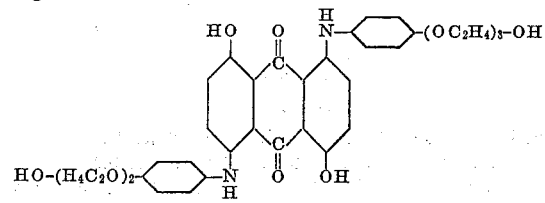

said dyes being present in such amounts as to give a neutral, optical density of from 0.1 to 0.4.

4. A photographic element comprising at least one photographic silver halide emulsion layer and a cellulose acetate layer containing a red dye selected from those of the monoazo dye series containing a di-(hydroxyethyl) aminophenyl-azophenyl group and a mixture of cyan dyes having the following formulas:

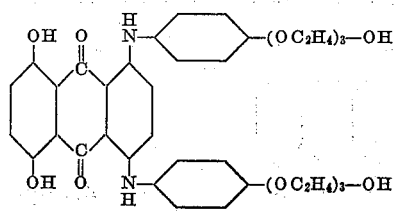

and

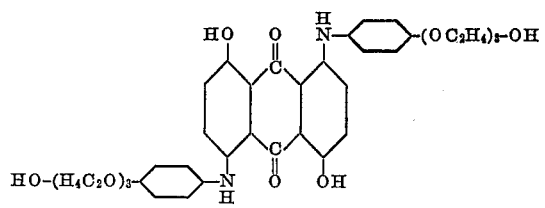

said dyes being present in such amounts as to give a neutral, optical density of from 0.1 to 0.4.

5. A photographic element comprising at least one photographic silver halide emulsion selected from the group consisting of silver bromide, silver chloride, silver bromiodide, and silver chlorobromide emulsions, and a cellulose acetate layer containing a red dye having the following formula:

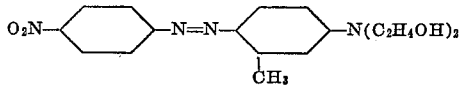

and a cyan dye having the following formula:

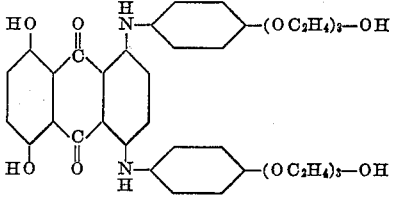

said dyes being present in such amounts as to give a neutral, optical density of from 0.1 to 0.4.

6. A photographic element comprising at least one photographic silver halide emulsion selected from the group consisting of silver bromide, silver chloride, silver bromiodide, and silver chlorobromide emulsions, and a cellulose acetate layer containing a red dye having the following formula:

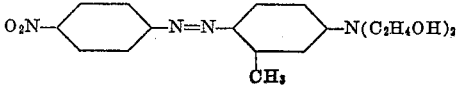

and a cyan dye having the following formula:

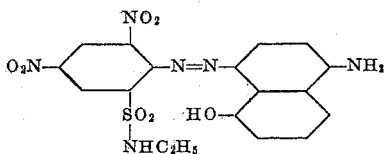

said dyes being present in such amounts as to give a neutral, optical density of from 0.1 to 0.4.

7. A photographic element comprising at least one photographic silver halide emulsion selected from the group consisting of silver bromide, silver chloride, silver bromiodide, and silver chlorobromide emulsions, and a cellulose acetate layer containing a red dye having the following formula:

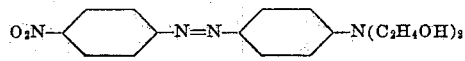

and a cyan dye having the following formula:

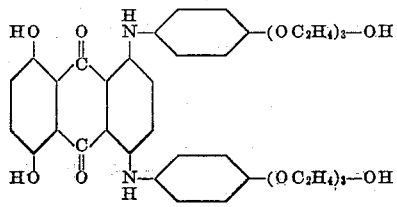

said dyes being present in such amounts as to give a neutral, optical density of from 0.1 to 0.4.

8. A photographic element comprising at least one photographic silver halide emulsion selected from the group consisting of silver bromide, silver chloride, silver bromiodide, and silver chlorobromide emulsions, and a cellulose acetate layer containing a red dye having the following formula:

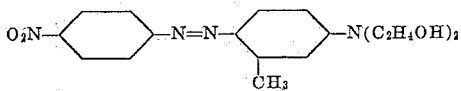

and a cyan dye having the following formula:

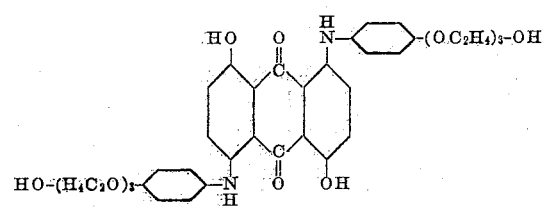

CLARENCE S. HUNTER.
FRED W. HOYT.
GALE F. NADEAU.

No references cited.